# 2,701,802

ANTHRAQUINONE DYES AND DYE INTERMEDIATES

Samuel N. Boyd, Jr., Salem, N. J., assignor to E. I. du Pont de Nemours and Company, Wilmington, Del., a corporation of Delaware No Drawing. Application October 9, 1953,
Serial No. 385,303

6 Claims. (Cl. 260—326)

This invention relates to the preparation of anthroquinone dyes and dye intermediates, and more particularly to the preparation of N-substituted 1,4-diamino-2,3-anthraquinone dicarboximides which may also be referred to as 2-(aminoalkyl)-4,11-diaminoanthra [2,3-c]-pyrrol-1-3,5,10-tetrones.

It is an object of this invention to produce blue dyes particularly suitable for application to cellulose acetate fibers and to "Dacron" polyester fibers which will exhibit satisfactory general fastness properties, particularly to light, washing and gas fumes. It is a further object of the invention to provide blue dyes which have improved affinity for cellulose acetate fibers and "Dacron" polyester fibers and which will therefore build-up in deeper shades than do the corresponding 1,4-diaminoanthraquinone dicarboximides which do not contain the novel substituents on the imide nitrogen more particularly disclosed in this application. It is a still further object of this invention to provide intermediates for the preparation of new cationic dyes, particularly suited to the dyeing of "Orlon" acrylic fibers.

The compounds of the present invention have the general formula:

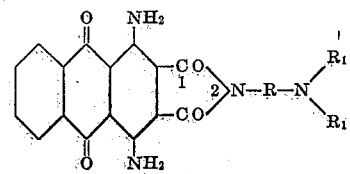

in which R stands for a radical of the group $$-CH_2-CH_2-, \quad -CH_2-CH_2-CH_2-,$$

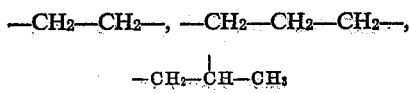

and

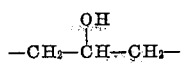

and $R_1$ stands for substituents of the group —H, —$CH_3$, —$C_2H_5$, —$CH_2$—$CH_2$—OH and —$CH_2$—$CH_2$—$NH_2$ but where one $R_1$ stands for one of the groups $$-CH_2-CH_2-OH \text{ and } -CH_2-CH_2-NH_2$$

the remaining $R_1$ stands for hydrogen.

The following examples are given to illustrate the invention. The parts used are by weight, unless otherwise designated.

Example 1

A mixture of 46 parts of 1,4-diamino-2,3-anthraquinone dicarboximide (which is made by the method of U. S. Patent No. 2,628,963), 23 parts of ethylene diamine and 168 parts of "Cellosolve" (2-ethoxy-ethanol) is heated with stirring for 1 hour at 105°–110° C. and 7 hours at 115°–120° C. After cooling to room temperature, the solid is separated by filtration, washed with methanol and then with water and dried. A yield of 44 parts (84% of the theoretical) of 1,4-diamino-N-(2-aminoethyl)-2,3-anthraquinone dicarboximide of the formula:

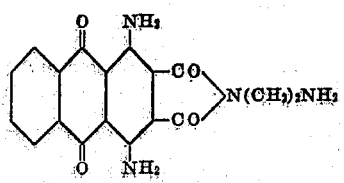

is obtained, having a melting point above 400° C. and a nitrogen analysis of 13.5%. This compound dyes cellulose acetate fiber and polyethylene terephthalate fiber in greenish-blue shades with excellent light and wash fastness.

Example 2

A mixture of 46 parts of 1,4-diamino-2,3-anthraquinone dicarboximide, 28 parts of 1,2-diaminopropane and 235 parts of ortho-dichlorobenzene is heated with stirring for 4 hours at 115° C. The product is isolated by the method of Example 1, giving a yield of 48 parts (89% of the theoretical). It has the formula:

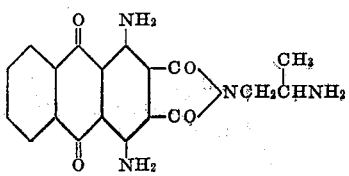

a melting point of 235° C. and a nitrogen analysis of 14.4%. This compound dyes cellulose acetate fiber and polyethylene terephthalate fiber in bright greenish-blue shades with excellent light and wash fastness.

Example 3

A mixture of 46 parts of 1,4-diamino-2,3-anthraquinone dicarboximide, 34 parts of 1,3-diamino-2-propanol and 168 parts of "Cellosolve" is heated for 3 hours at 120° C., and the product is isolated by the method of Example 1. The yield is 42 parts (73% of the theoretical) of the compound of the formula:

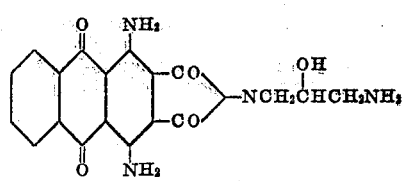

having a melting point of 292° C. and a nitrogen analysis of 14.4%. The compound dyes cellulose acetate fiber and polyethylene terphthalate fiber a bright greenish-blue shade with excellent light and wash fastness.

Example 4

A mixture of 46 parts of 1,4-diamino-2,3-anthraquinone dicarboximide and 33 parts of N,N-dimethylethylene diamine is heated in 168 parts of nitrobenzene for one hour at 105°–110° C. and for an additiontal 7 hours at 115°–120° C. After cooling at room temperature, the mass is filtered and the filter cake washed with methanol, then with water, and dried. A yield of 85% of theory of the 1,4-diamino-N-(2-dimethylaminoethyl)-2,3-anthraquinone dicarboximide of the following formula:

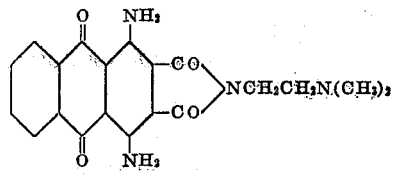

is obtained which has a nitrogen analysis of 13.5%. It dyes cellulose acetate fiber and polyethylene terephthalate fiber in bright greenish-blue shades of excellent light and wash fastness.

Example 5

A mixture of 46 parts of 1,4-diamino-2,3-anthraquinone dicarboximide and 43.5 parts of N,N-diethyl-ethylene diamine are heated with stirring in 168 parts of nitrobenzene for one hour at 105°–110° C., then for an additional 7 hours at 115°–120° C. After cooling to room temperature, the mass is filtered and the filter cake washed with methanol, then with water, and dried. A yield of 85% of theory of the 1,4-diamino-N-(2-diethylaminoethyl)-2,3-anthraquinone dicarboximide is obtained having a nitrogen analysis of 14.5%. This product dyes cellulose acetate and polyethylene terephthalate fibers in bright greenish-blue shades of excellent light and wash fastness properties.

Example 6

A mixture of 46 parts of 1,4-diamino-2,3-anthraquinone dicarboximide and 39 parts of N-(2-hydroxyethyl)-ethylene diamine is heated in 168 parts of "Cellosolve" while stirring for one hour at 105°–110° C. and thereafter heated for 7 hours at 115°–120° C. After cooling to room temperature, the reaction mass is filtered and the filter cake is washed with methanol, then with water and dried. A yield of 88% of theory of the 1,4-diamino-N-(2-hydroxyethylaminoethyl)-2,3-anthraquinone dicarboximide of the formula:

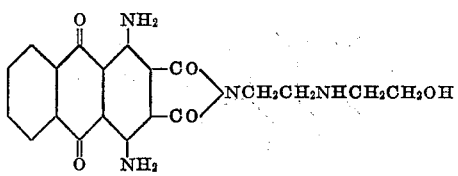

is obtained having a melting point of 215° C. and a nitrogen analysis of 13.8%. This product dyes cellulose acetate fiber and polyethylene terephthalate fiber in bright greenish-blue shades having excellent light and wash fastness.

Example 7

A mixture of 46 parts of 1,4-diamino-2,3-anthraquinone dicarboximide and 39 parts of diethylene triamine is heated in 168 parts of "Cellosolve" with stirring for one hour at 105°–110° C., and then for 7 hours at 115°–120° C. After cooling to room temperature, the reaction mass is filtered and the filter cake washed with methanol, then with water and dried. A yield of 72% of theory of the 1,4-diamino-N-(2-aminoethylaminoethyl)-2,3-anthraquinone dicarboximide of the formula:

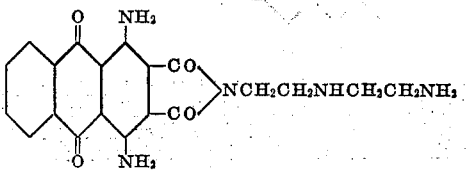

is obtained. This compound dyes cellulose acetate fiber and polyethylene terephthalate fiber in bright greenish-blue shades having excellent light and wash fastness.

Example 8

Where 44 parts of N-(2-hydroxyethyl)-1,3-propane diamine is substituted for the ethylene diamine of Example 1, a yield of 82% of theory of the product having the formula:

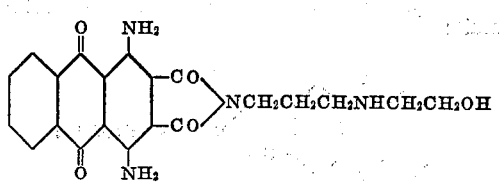

is obtained having a melting point of 215° C. and a nitrogen analysis of 13.2%. This compound dyes cellulose acetate fiber and polyethylene terephthalate fiber in bright greenish-blue shades having excellent light and wash fastness.

Example 9

When 38 parts of N,N-dimethyl-1,3-propane diamine is substituted for the ethylene diamine in Example 1 and the reaction mass is heated for 5 hours at 95°–100° C., a yield of 82% theory of the product having the formula:

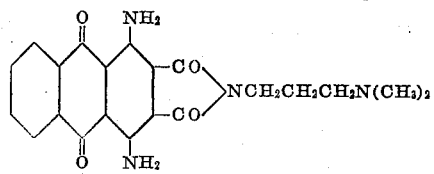

is obtained having a melting point of 214° C. and a nitrogen analysis of 14.1%. This compound dyes cellulose acetate fiber and polyethylene terephthalates fiber in bright greenish-blue shades having excellent light and wash fastness properties.

While in the examples the solvents "Cellosolve," orthodichlorobenzene and nitrobenzene are employed, any inert organic solvent having a boiling point in the region of the reaction temperature may be substituted, e. g. toluene, the xylenes, monochlorobenzene, nitrochlorobenzenes, trichlorobenzenes, butyl alcohol, methyl "Cellosolve" (2-methoxy-ethanol) and ethylene glycol.

The temperatures preferably employed range from 95° to 120° C., although these temperatures are not critical and higher or lower temperatures may be used. Below about 80° C. the reaction is very slow. At very high temperatures the aliphatic amine apparently reacts with the primary amino groups in the anthraquinone alpha-positions to split off $NH_3$, and red impurities tend to be formed.

The products of this invention are particularly useful as dispersion dyes for cellulose acetate and "Dacron" polyester fibers, and as intermediates in the preparation of new dyes more particularly disclosed in co-pending application Serial No. 385,302 filed of even date herewith.

These products when used as dispersed dyes may be used individually or mixed with other dyes of the same type, or with dyes such as disclosed in U. S. Patent 2,628,963 to produce colors having excellent build-up properties. The compounds of this application when used as dispersed dyes have outstanding gas fume fastness on "Dacron" polyester fiber, and more particularly on cellulose acetate fiber. The gas fume fastness of the colors of this application are much improved over the compounds of similar shade disclosed in U. S. Patent 2,050,662, since the new colors fade only slightly upon exposure and then toward green as distinguished from those of the patent above mentioned, which fade toward the red shade. The light fastness of the dyes of this application on cellulose acetate range from 5 to 6 and on "Dacron" polyester fiber from 7 to 8, using the standard fastness scale.

I claim:

1. Compounds of the formula:

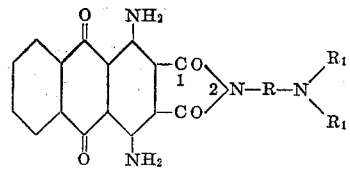

in which R stands for a radical of the group

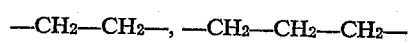

$$-CH_2-\overset{|}{CH}-CH_2$$

and

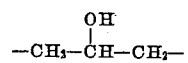

and $R_1$ stands for substituents of the group —H, —$CH_3$, —$CH_2H_5$, —$CH_2$—$CH_2$—OH and —$CH_2$—$CH_2$—$NH_2$, but where one $R_1$ stands for one of the group

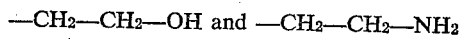

the remaining $R_1$ stands for hydrogen.

2. The compound of the formula:
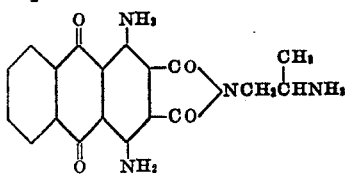
3. The compound of the formula:
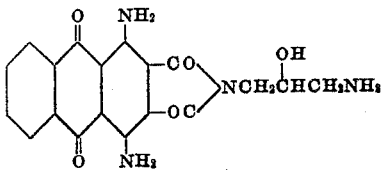
4. The compound of the formula:
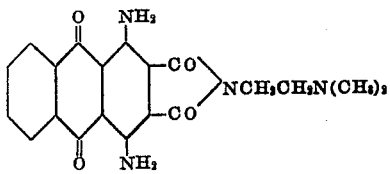
5. The compound of the formula:
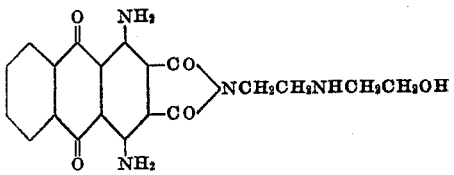
6. The compound of the formula:
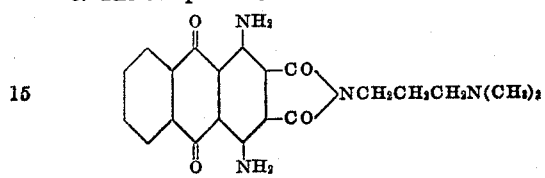
No references cited.